(12) United States Patent
Daniel

(10) Patent No.: US 11,267,065 B2
(45) Date of Patent: Mar. 8, 2022

(54) SYSTEMS AND METHODS PROVIDING PATTERN RECOGNITION AND DATA ANALYSIS IN WELDING AND CUTTING

(71) Applicant: Lincoln Global, Inc., Santa Fe Springs, CA (US)

(72) Inventor: Joseph A. Daniel, Sagamore Hills, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 405 days.

(21) Appl. No.: 16/278,232

(22) Filed: Feb. 18, 2019

(65) Prior Publication Data

US 2020/0261997 A1    Aug. 20, 2020

(51) Int. Cl.
*B23K 9/095*    (2006.01)
*G06K 9/62*    (2022.01)

(52) U.S. Cl.
CPC ............ *B23K 9/095* (2013.01); *G06K 9/6218* (2013.01)

(58) Field of Classification Search
CPC .... B23K 9/095; B23K 9/0953; B23K 31/125; G06K 9/6218; G06N 5/04; G06N 7/005
See application file for complete search history.

(56) References Cited

U.S. PATENT DOCUMENTS

| | | | |
|---|---|---|---|
| 7,375,304 B2 | 5/2008 | Kainec et al. | |
| 8,224,881 B1 | 7/2012 | Spear et al. | |
| RE45,398 E | 3/2015 | Wallace | |
| 10,010,959 B2 | 7/2018 | Daniel | |
| 10,137,522 B2 | 11/2018 | Winn | |
| 10,144,080 B2 | 12/2018 | Chantry et al. | |
| 2013/0075380 A1 | 3/2013 | Albrech et al. | |

(Continued)

FOREIGN PATENT DOCUMENTS

| | | |
|---|---|---|
| WO | 2013/175079 A1 | 11/2013 |
| WO | 2014/143532 A1 | 9/2014 |

OTHER PUBLICATIONS

Bao, et al.; "Massive Sensor Data Management Framework in Cloud Manufacturing Based on Hadoop;" 2010 10th IEEE International Conference; Dated Jul. 25, 2012; pp. 397-401.

(Continued)

*Primary Examiner* — Brian W Jennison
(74) *Attorney, Agent, or Firm* — David J. Muzilla

(57) ABSTRACT

Embodiments of systems and methods providing pattern recognition and data analysis in welding and cutting are disclosed. In one embodiment, a system includes a server computer and a data store connected to the server computer. The server computer receives welding data, including core welding data and non-core welding data, over a computer network from welding systems used to generate multiple welds to produce multiple instances of a same type of part. The server computer performs an analysis on the welding data to identify and group same individual welds of the multiple welds without relying on weld profile identification numbers as part of the analysis. A group of the same individual welds corresponds to a same weld location on the multiple instances of the same type of part. The data store receives the welding data from the server computer and digitally stores the welding data as identified and grouped.

20 Claims, 8 Drawing Sheets

(56) References Cited

U.S. PATENT DOCUMENTS

2017/0032281 A1\* 2/2017 Hsu .................... B23K 31/125
2017/0270434 A1 9/2017 Takigawa et al.

OTHER PUBLICATIONS

Extended European Search Report from Corresponding European Application No. 20157943.0; dated May 7, 2020 pp. 1-10.
Lincoln Electric; "Cloud-Based Production Monitoring Reshapes Weld Performance Tracking;" https://www.lincolnelectric.com/en-us/support/process-and-theory/Pages/cloud-based-production-monitoring.aspx; Acessed on Oct. 31, 2018; pp. 1-9.
Sumesh, et al.; "Use of Machine Learning Algorithms for Weld Quality Monitoring using Acoustic Signature;" Procedia Computer Science; vol. 50; Dated Mar. 12, 2015; pp. 316-322.
Zhang, et al.; "Welding Quality Monitoring And Management System Based On Data Mining Technology;" Proceedings of the Second International Conference on Machine Learning and Cybernetics, Xi; Dated Nov. 2, 2003; pp. 13-17.

\* cited by examiner

| Weld Number | Voltage | Amperage | Part Weld ID | Pre-idle Time |
|---|---|---|---|---|
| 100 | 24.0 | 200 | 1 | 50 sec. |
| 101 | 26.5 | 350 | 2 | 8 sec. |
| 102 | 24.0 | 200 | 3 | 12 sec. |
| 103 | 26.5 | 350 | 4 | 2 sec. |
| 104 | 24.0 | 200 | 1 | 45 sec. |
| 105 | 26.5 | 350 | 2 | 7 sec. |
| 106 | 24.0 | 200 | 3 | 13 sec. |
| 107 | 26.5 | 350 | 4 | 3 sec. |

SYSTEMS AND METHODS PROVIDING PATTERN RECOGNITION AND DATA ANALYSIS IN WELDING AND CUTTING

CROSS REFERENCE TO RELATED APPLICATIONS/INCORPORATION BY REFERENCE

U.S. Pat. No. 10,010,959 B2 issued on Jul. 3, 2018 is incorporated herein by reference in its entirety, providing details of associating data to welding power sources. U.S. Pat. No. 10,137,522 B2 issued on Nov. 27, 2018 and U.S. Pat. No. 10,144,080 B2 issued on Dec. 4, 2018 are each incorporated herein by reference in their entirety, providing details of cutting systems and cutting tools (torches). U.S. Pat. No. 8,224,881 B1 issued on Jul. 17, 2012 is incorporated herein by reference in its entirety, providing details of components that can be run on a server computer.

FIELD

Embodiments of the present invention relate to systems and methods related to welding and cutting, and more specifically to systems and methods providing pattern recognition and data analysis in welding and cutting.

BACKGROUND

In a competitive, global economy, efficiency reigns supreme on the shop floor, especially when it comes to overall equipment effectiveness. Well-run fabrication shops have become increasingly vigilant about keeping costs under control while striving to reach higher levels of productivity and quality in all aspects of the production cycle. Welding and cutting operations are no exception.

Any welding or cutting process improvement demands the ability to benchmark and measure successes. There is a desire to drive productivity up without increasing costs. While some turn to such tools as automation and other methods that streamline the actual process, simpler tools that allow evaluation and analysis of productivity and throughput can have an immense impact on a company's bottom line.

The welding and cutting industries have access to monitoring tools that enable any networked welding or cutting power source to transmit its performance data. These systems can track metrics and provide analysis down to the level of a single weld or cut performed by a particular operator on a specific welder or cutter during a certain shift, so as to establish productivity benchmarks, support, troubleshooting capability, and more.

In the past decade or so, solutions have been evolving to help fab shops and manufacturers develop custom tracking solutions based on their needs and core technologies in a way that delivers a detailed view into the welding or cutting production environment. While the earliest of these programs ran on PC's linked to specific power sources and had no remote tracking capabilities, some of today's systems have expanded beyond the limiting desktop environment and automatically move data into "the cloud". This makes the concept of around-the-clock production monitoring from anywhere on the globe on almost any device, whether it be a laptop computer, a smartphone, or and iPad® or other tablet, a functional reality.

Production monitoring allows users at any level of an organization to view pertinent live information about each welder or cutter and analyze performance at a highly granular level. These systems also help organizations track preventive maintenance activities and red flag welding or cutting related issues on any station in the production line, allowing engineers to prevent problems before they occur.

While production monitoring solutions initially were designed to focus solely on production metrics, user demands for record retention and other quality assessment support grew and started to expand the functionality of these systems. The monitoring technologies themselves have continued to evolve to include a focus on quality metrics. Quality tracking now is a hallmark of any good production monitoring system. New tools can reliably evaluate welds created at each station and, while not meant to replace actual quality assurance testing methods, provide a benchmark that reflects a strong probability that the part is going to be good or not.

But, that hasn't been the only marked evolution in these systems over the past several years. As larger companies with facilities in multiple locations embraced technology and the widespread means of mobile communications grew, users started to demand something even more user friendly, enabling them to access data, not only locally but also globally, on the fly from the road or in the factory at the welding or cutting station, from any device without relying on the company's own computer servers and intranet access.

Furthermore, when attempting to analyze collected welding or cutting data with advanced Machine Learning (ML) algorithms, there is a high degree of difficulty when clustering data for individual welds or cuts. This is difficult because the welding or cutting data is often unlabeled from a traceability point of view. The source of the data is known and normally the part number of a part type is easy to record, but the individual identification of a weld or cut taking place on a part is often unknown/unlabeled. In addition, several welds (or cuts) can easily overlap, from a clustering point of view, because the data parameters are similar but the welds (or cuts) need to be allocated into different clusters.

Data collection of welding information exists in the Lincoln Electric CheckPoint project that has been available for 10+ years. This system has the ability to select and define weld profiles which serve to uniquely identify the welds on a specific part. However, there is a risk that weld profile identification numbers are unknowingly reused; this would incorrectly group a dissimilar batch of weld records (welding data for different types of welds). Incorrect identification would cause additional problems with defect detection, traceability, and grouping of data for analysis. In another example, weld profile identification numbers may not be defined or may only be partially defined by the system controller; this again causes problems with defect detection, traceability, and grouping of data.

SUMMARY

Embodiments of the present invention include systems and methods related to welding and cutting, and more specifically to systems and methods providing pattern recognition and data analysis in welding and cutting.

In one embodiment, a system for welding production monitoring and data analysis are provided. The system includes at least one server computer having an analytics component and at least one data store operatively connected to the at least one server computer. The server computer is configured to receive welding data, including core welding data and non-core welding data, over a computer network from a plurality of welding systems operatively connected to the computer network and used to generate multiple welds to produce multiple instances of a same type of part, where the welding data corresponds to the multiple welds. The server computer is also configured to perform an analysis on the welding data to identify and group same individual welds of the multiple welds without relying on weld profile identification numbers received from the plurality of welding systems as part of the analysis. A group of the same individual welds corresponds to a same weld location on the multiple instances of the same type of part. The data store is configured to receive the welding data, corresponding to each individual weld of the same individual welds, from the server computer and digitally store the welding data as identified and grouped. In one embodiment, the analysis is a cluster analysis. In one embodiment, the system is located remotely from the plurality of welding systems. In one embodiment, the core welding data includes data related to at least one of welding output voltage, welding output current, wire feed speed, arc length, stick out, contact tip-to-work distance (CTWD), work angle, travel angle, travel speed, gas flow rate, welding movements of the welding tool, wire type, amount of wire used, and deposition rate. In one embodiment, the non-core welding data includes data related to pre-idle times (i.e., the idle time before a weld is started). In one embodiment, the non-core welding data includes data related to non-welding movements of a welding tool (torch) between consecutive welds on the multiple instances of the same type of part. In one embodiment, the non-core welding data includes data related to temperatures of the multiple instances of the same type of part after each weld of the multiple welds is generated. In one embodiment, the non-core welding data includes data related to one or more of time, day, and date (e.g., when the weld was generated). In one embodiment, the multiple welds are robotically generated by the plurality of welding systems. In one embodiment, the multiple welds are generated by human operators using the plurality of welding systems. In one embodiment, the server computer and the data store are configured as a database system that can be queried for the welding data, as stored, by a client computer operatively connected to the computer network.

In one embodiment, a system for metal cutting production monitoring and data analysis are provided. The system includes at least one server computer having an analytics component and at least one data store operatively connected to the at least one server computer. The server computer is configured to receive cutting data, including core cutting data and non-core cutting data, over a computer network from a plurality of metal cutting systems operatively connected to the computer network and used to generate multiple cuts to produce multiple instances of a same type of part, where the cutting data corresponds to the multiple cuts. The server computer is also configured to perform an analysis on the cutting data to identify and group same individual cuts of the multiple cuts without relying on cutting profile identification numbers received from the plurality of metal cutting systems as part of the analysis. A group of the same individual cuts corresponds to a same cut location on the multiple instances of the same type of part. The data store is configured to receive the cutting data, corresponding to each individual cut of the same individual cuts, from the server computer and digitally store the cutting data as identified and grouped. In one embodiment, the analysis is a cluster analysis. In one embodiment, the system is located remotely from the plurality of metal cutting systems. In one embodiment, the core cutting data includes data related to at least one of arc voltage, cutting current, various gas pressures, various gas flow rates, initial pierce height, work angle of the cutting tool, travel angle of the cutting tool, cutting speed of the cutting tool, tool-to-work distance, and cutting movements of the cutting tool. In one embodiment, the non-core cutting data includes data related to pre-idle times (i.e., the idle time before a cut is started). In one embodiment, the non-core cutting data includes data related to non-cutting movements of a cutting tool (torch) between consecutive cuts on the multiple instances of the same type of part. In one embodiment, the non-core cutting data includes data related to temperatures of the multiple instances of the same type of part after each cut of the multiple cuts is generated. In one embodiment, the non-core cutting data includes data related to one or more of time, day, and date (e.g., when a cut was generated). In one embodiment, the multiple cuts are robotically generated by the plurality of metal cutting systems. In one embodiment, the multiple cuts are generated by human operators using the plurality of metal cutting systems. In one embodiment, the at least one server computer and the at least one data store are configured as a database system that can be queried for the cutting data, as stored, by a client computer operatively connected to the computer network.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
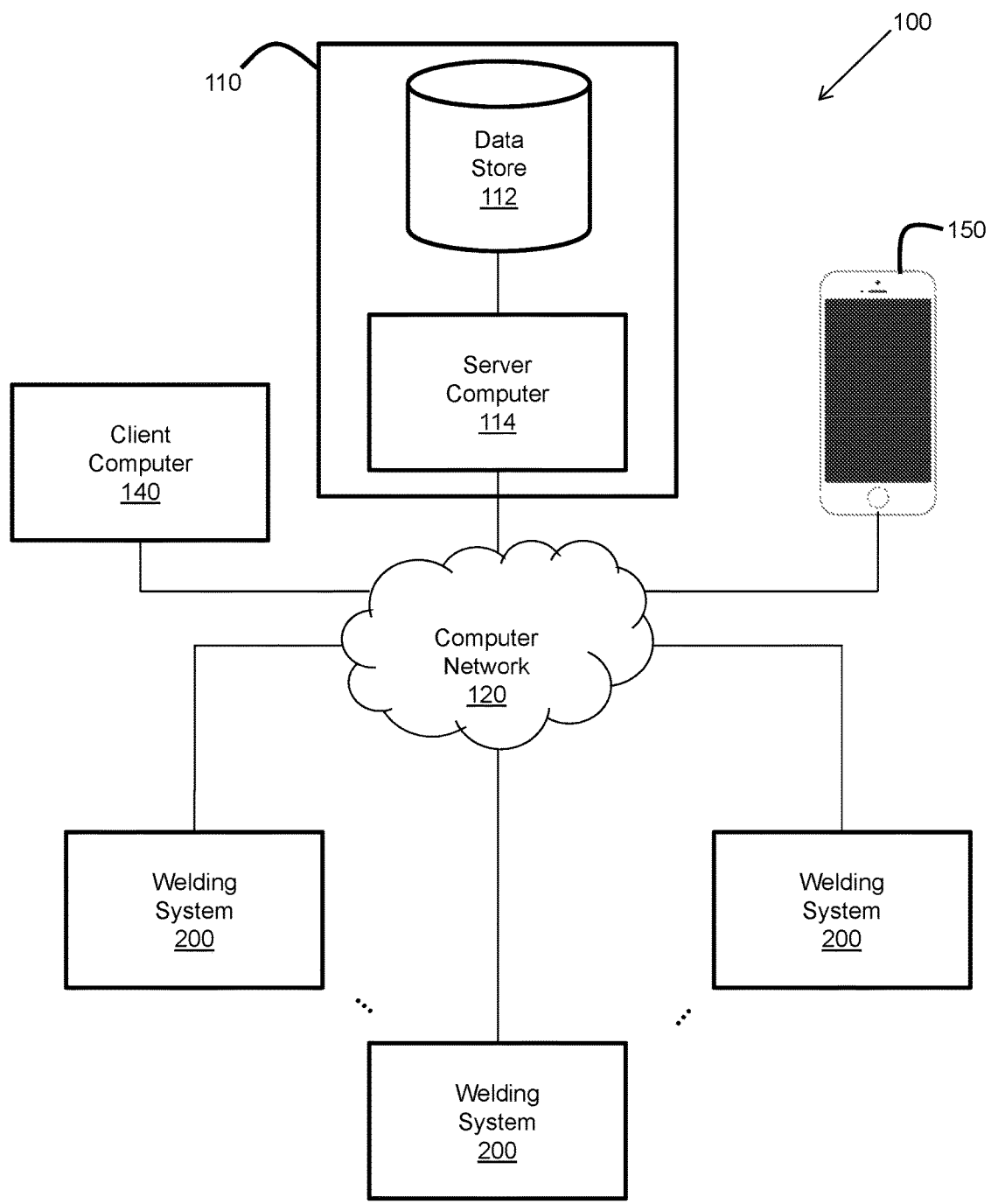
FIG. 1 illustrates a first embodiment of a system architecture having a system (a server computer and a data store) being located, for example, in the cloud remotely from a plurality of welding systems and client computers.

Rather than having the production monitoring solution hosted on a server at a company location, some embodiments of the present invention may be implemented in the cloud where data is uploaded to a central server that provides a discrete database for each customer. However, other embodiments may not be implemented in the cloud as such. Production monitoring in the cloud delivers a permanent connection where data routinely flows from a company's welding or cutting power sources up to a secure data center and down to any device, for example, via a common Internet browser on a desktop PC or a laptop, or via mobile apps on a smartphone or a tablet.

Cloud-based production monitoring provides a huge advantage over the previous VPN platform, especially for companies with multiple locations, by providing a simple way to accumulate data from these locations into an easily accessible central database that can be accessed from anywhere.

Mobile ready apps for handheld devices further simplify information gathering and review. These dedicated apps, which run through the cloud, provide only the information users want to see at their fingertips. While it is unlikely users will want to attempt to create a detailed report on an iPhone®, it is likely that a line manager could want to view the output of a specific machine to troubleshoot issues while in the shop at the workstation or after hours when he's off site. Through a mobile app, he can get the pertinent information he needs without being tethered to the desktop. Monitoring from the cloud also eliminates the need to invest IT manpower and equipment because on-site servers no longer are needed. No onsite software installation is required. Software maintenance and upgrades are handled automatically at the cloud server.

In one embodiment, a user can simply connect the welder or cutter via Ethernet and login with a unique login and a secure password. Following set up, users can log in and start tracking welding performance data on any welder or cutter in the system, all of which are identified by their unique serial number. It is basically plug and play using an internet connection.

Once online, the welding or cutting power source initiates communications with the server, sending data packets at periodic intervals to the cloud database. Thanks to serial number tracking, all welders or cutters in a facility, or even company-wide at multiple locations, can be accounted for in the cloud. This is done securely through encryption, user authentication, and other security features (e.g., using block chain technology). A user can use a secure user name and password to access pertinent data at any time of the day.

Once logged in, users can customize the system's interface to suit their own requirements, mirroring the system to the shop floor layout in one or many locations. These systems also can provide different layers of role-based access and data dissemination for any level of user. For example, senior management may want to have only the "50,000-foot view," for asset utilization purposes, while production managers and supervisors may focus more closely on such things as shift statistics, daily production statistics, and other metrics for analysis and quick decision making. Production monitoring solutions can assist production level management in strategically identifying such issues as persistent bottlenecks and help them use that information to devise long-term solutions from a production standpoint.

At the welding/cutting engineer and supervisor level, data reviewed typically focuses on quality. For example, production monitoring can help personnel in these positions to track the day, time, wire type and usage, how much weld metal was used, the wire feed speed and deposition rates—to name only a few parameters. In short, it can provide all of the information about a weld (or cut) that any fabrication role would need. And, it captures it for every weld (or cut) on every machine connected to the system.

In one embodiment, the system can also track welding wire consumable usage and change outs. The consumable type and package size for each welder can be set so the level of wire being consumed and can be measured digitally. The monitoring system then will alert a designated individual or individuals, via email, when the wire supply is low.

Even those involved in field welding or cutting operations now have the option for detailed tracking, thanks to the cloud. In the past, wiring a network to a line of welders on a construction site or an Alaskan pipeline project wasn't all that simple. With cloud computing, all you need is access to the Internet, through a low cost and readily available mobile hot spot device like a MiFi® or others. One key difference, beyond the cloud functionality, is traceability which can be accessed in full reporting from a PC or in abbreviated form from a mobile device.

Solutions offer traceability reporting, a key consideration for those fabricators who must, in turn, hold records for customer review on welding consumable certifications, maintain records for quality initiatives and other similar activities. In one embodiment, three user-determined fields can be tracked—operator ID, part ID, and consumable—in short, who did the weld, on what part, and with which welding wire consumable spool or package. All of this can be viewed easily on mobile devices or downloaded for record retention.

From helping to track flow manufacturing and minimizing material movement to examining equipment or operator performance, monitoring solutions described herein have moved beyond basic production tracking and metrics to detailed analytics and customized information for all levels of an organization. A centrally-located, reliable database helps maintain ongoing records retention by capturing pertinent audit trail data.

However, for data to be useful, whether stored in the cloud or not, the data must be properly collected from the welding (or cutting) systems and properly organized. One embodiment of the present invention is a method for identifying and grouping data (e.g., in the cloud) for individual welds of a part by utilizing additional parameters outside the core welding data. Examples include the pre-idle time (i.e., the idle time before a weld is started), and/or data related to the non-welding movement of the tool (torch) or part between welds. Using this additional non-core welding data along with the core welding data (i.e., using two separate categories of welding data) provides an improved method for recognizing a sequential pattern of events (and welds) related to the complete cycle of welding/producing a part. Following the sequential pattern for a specific part, individual welds can be identified (e.g., labeled for subsequent use by machine learning algorithms) and correctly grouped without the need to explicitly use weld profile identification numbers.

Another embodiment of the present invention is a method for identifying and grouping data (e.g., in the cloud) for individual cuts on a metal part by utilizing additional parameters outside the core cutting data. Examples include the pre-idle time (i.e., the idle time before a cut is started), and/or data related to the non-cutting movement of the cutting tool or part between cuts. Using this additional non-core cutting data along with the core cutting data (i.e., using two separate categories of cutting data) provides an improved method for recognizing a sequential pattern of events (and cuts) related to the complete cycle of cutting/ producing a part. Following the sequential pattern for a specific part, individual cuts can be identified (e.g., labeled for subsequent use by machine learning algorithms) and correctly grouped without the need to explicitly use cutting profile identification numbers.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 and FIG. 3 put embodiments of the subject invention in context.

Referring to FIG. 1, FIG. 1 illustrates a first embodiment of a system architecture 100 having a system 110 (including a server computer 114 and a data store 112) being located, for example, in the cloud remotely from a plurality of welding systems 200, a client computer(s) 140 (e.g., desktop or laptop PCs), and a mobile device(s) 150 (e.g., smart phones). In alternative embodiments, the system 110 is not located in the cloud (e.g., the system 110 is located in a manufacturing facility with the welding systems 200). The mobile device(s) 150 is effectively a type of client computer as well. Therefore, at times herein, the term "client computer" may be used broadly to refer to any type of client computer. Each welding system 200 (e.g., an arc welding system) may include, for example, a power source, a welding tool (torch), a wire feeder, and a robot subsystem to move the welding tool (torch), or a part being welded, with respect to each other to make welds on the part. Alternatively, instead of having a robot subsystem, a human operator may move the welding tool (torch) with respect to a part during a welding operation (e.g., a manual welding operation or a semi-automatic welding operation).

In FIG. 1, the welding systems 200, the client computer(s) 140, and the mobile device(s) 150 communicate with the system 110 via a computer network 120. In accordance with one embodiment, the computer network 120 is the Internet and the system 110 is located remotely from the welding systems 200, the client computer(s) 140, and the mobile device(s) 150 in the cloud. In accordance with other embodiments, the computer network 120 may be, for example, a local area network (LAN), a wide area network (WAN), or some other type of computer network that is appropriate for the environment (e.g., the cloud, a campus, or a manufacturing facility) in which the system 110 exists with respect to the welding systems 200, the client computers 140, and the mobile devices 150. Furthermore, the computer network 120 may be wired, wireless, or some combination thereof, in accordance with various embodiments. In accordance with one embodiment, the welding systems 200 connect to the computer network 120 via an Ethernet connection.

As discussed later herein in more detail, in one embodiment, the server computer 114 is configured to receive welding data from the welding systems 200 over the computer network 120, analyze the welding data, and store the results of the analysis (e.g., grouped welding data) in the data store 112. Furthermore, in one embodiment, the server computer 114 is configured to receive client requests for data from the client computer(s) 140 and the mobile device(s) 150, retrieve the requested data from the data store 112, and provide the requested data to the client computer(s) 140 and the mobile device(s) 150 over the computer network 120. In such an embodiment, the server computer 114 and the data store 112 may be configured as a database system that can be queried for the welding data, as stored, by a client computer 140 or mobile device 150 operatively connected to the computer network 120.

Figure 2:
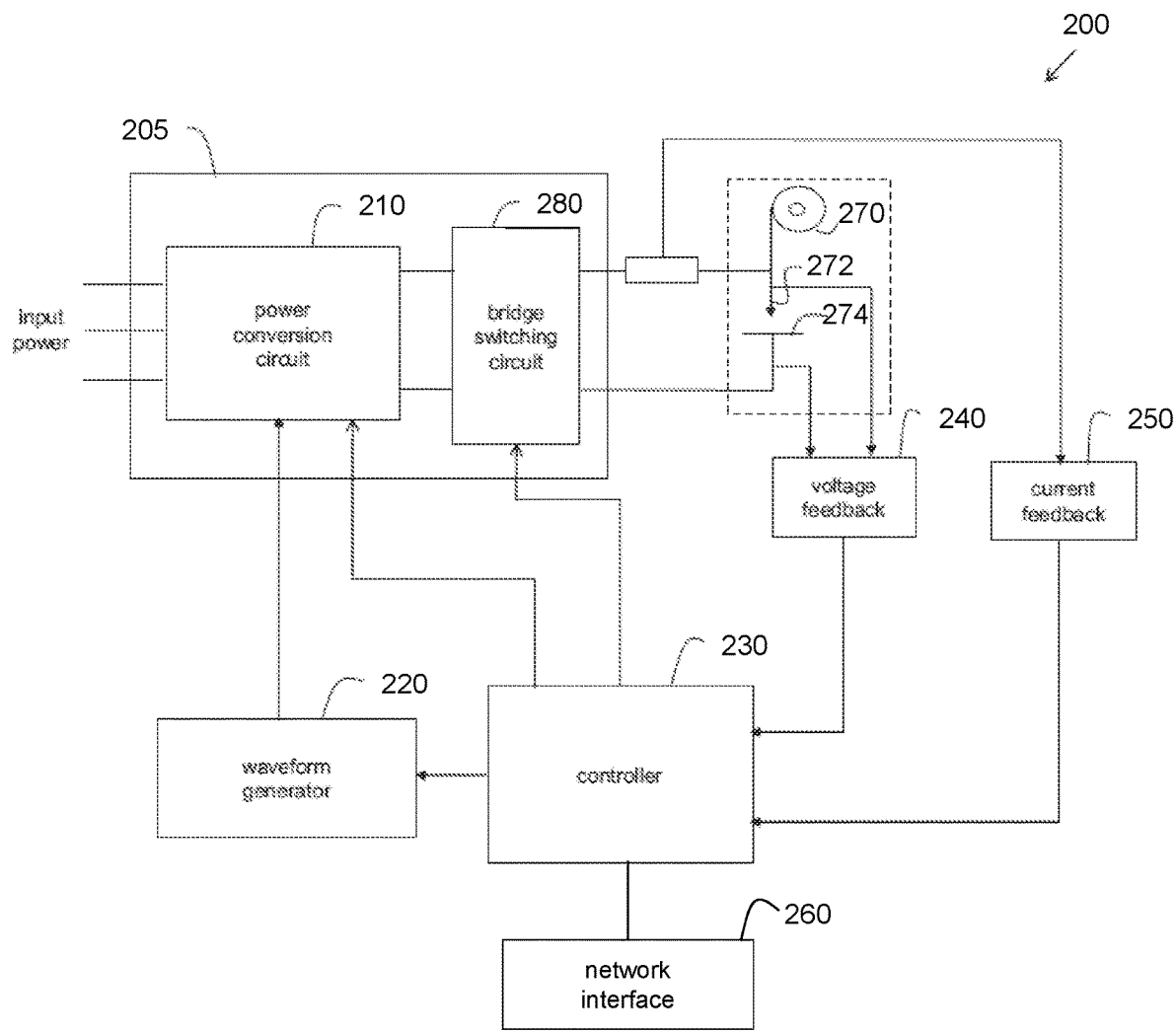
FIG. 2 illustrates a schematic block diagram of one example embodiment of a welding system of the system architecture of FIG. 1.

FIG. 2 illustrates a schematic block diagram of one example embodiment of a welding system 200 of the system architecture 100 of FIG. 1 operatively connected to a consumable wire electrode 272. The welding system 200 includes a switching power supply 205 having a power conversion circuit 210 and a bridge switching circuit 280 providing welding output power between the wire 272 and a workpiece part 274 to melt the wire 272 during welding by forming an arc between the wire 272 and the part 274. The power conversion circuit 210 may be transformer based with a half bridge output topology. For example, the power conversion circuit 210 may be of an inverter type that includes an input power side and an output power side, for example, as delineated by the primary and secondary sides, respectively, of a welding transformer. Other types of power conversion circuits are possible as well such as, for example, a chopper type having a DC output topology. The welding system 200 may also include a bridge switching circuit 280 (optional) that is operatively connected to the power conversion circuit 210 and is configured to switch a direction of the polarity of the welding output current (e.g., for AC operation).

The welding system 200 further includes a waveform generator 220 and a controller 230. The waveform generator 220 generates welding waveforms at the command of the controller 230. A waveform generated by the waveform generator 220 modulates the output of the power conversion circuit 210 to produce the output current between the wire 272 and the workpiece part 274. The controller 230 also commands the switching of the bridge switching circuit 280 and may provide control commands to the power conversion circuit 210.

In one embodiment, the welding system further includes a voltage feedback circuit 240 and a current feedback circuit 250 to monitor the welding output voltage and current between the wire 272 and the workpiece part 274 and provide the monitored voltage and current back to the controller 230 as core welding data. The feedback voltage and current may be used by the controller 230 to make decisions with respect to modifying the welding waveform generated by the waveform generator 220 and/or to make other decisions that affect operation of the welding system 200, for example.

In accordance with one embodiment, the switching power supply 205, the waveform generator 220, the controller 230, the voltage feedback circuit 240, the current feedback circuit 250, and the network interface 260 constitute a welding power source. The welding system 200 may also include a wire feeder 270 that feeds the consumable metal wire 272 toward the workpiece part 274 through the welding tool (torch) (not shown) at a selected wire feed speed (WFS), in accordance with one embodiment. The wire feeder 270, the consumable metal wire 272, and the workpiece part 274 are not part of the welding power source but may be operatively connected to the power source via one or more output cables, for example.

In accordance with one embodiment, the controller 230 measures, calculates, and collects various types of welding data from the welding system 200 for each weld created, including core welding data and non-core welding data. Techniques for measuring, calculating, and collecting various types of core welding data are well known in the art. Core welding data may include data related to parameters of one or more of, for example, welding output voltage, welding output current, wire feed speed, arc length, stick out, contact tip-to-work distance (CTWD), work angle, travel angle, travel speed, gas flow rate, welding movements of the welding tool (torch), wire type, amount of wire used, and deposition rate. Such core welding parameters are well known in the art.

Non-core welding data may include data related to, for example, pre-idle times (i.e., the idle time before a weld is started), non-welding movements of a welding tool (torch) between generating consecutive welds on a part, temperatures of a part after each weld, time, day, and date. Other types of core welding data and non-core welding data are possible as well, in accordance with other embodiments. For example, other data may include operator ID, part ID, consumable spool type or package type.

The data related to pre-idle times (i.e., the idle time before a weld is started) may be generated by, for example, timer circuitry (not shown) within the controller 230, in accordance with one embodiment, based on times when the data related to the welding output voltage and current are not indicating that a weld is being generated, for example. The data related to movements of a welding tool (torch) during welding or non-welding movements of a welding tool (torch) between generating consecutive welds on a part may be generated by, for example, a gyroscope, an accelerometer, or some other type of inertial measurement unit (not shown) attached to or integrated into the welding tool (torch) and operatively connected to the controller 230, in accordance with various embodiments. The data related to temperatures of a part after each weld may be generated by, for example, an infrared sensor (not shown) or some other type of temperature sensor of the welding system 200 operatively connected to the controller 230, in accordance with various embodiments.

The network interface 260 (e.g., an Ethernet interface in one embodiment) is configured to take the core welding data and the non-core welding data from the controller 230, for each weld generated on a part by the welding system 200, and communicate the core welding data and the non-core welding data over the computer network 120 (e.g., the Internet) to the system 110 (e.g., in the cloud). In this way, the system 110 is able to collect welding data (core and non-core) from each welding system 200 of the system architecture 100 for analysis. In accordance with one embodiment, the network interface 260 is part of the controller 230.

Figure 3:
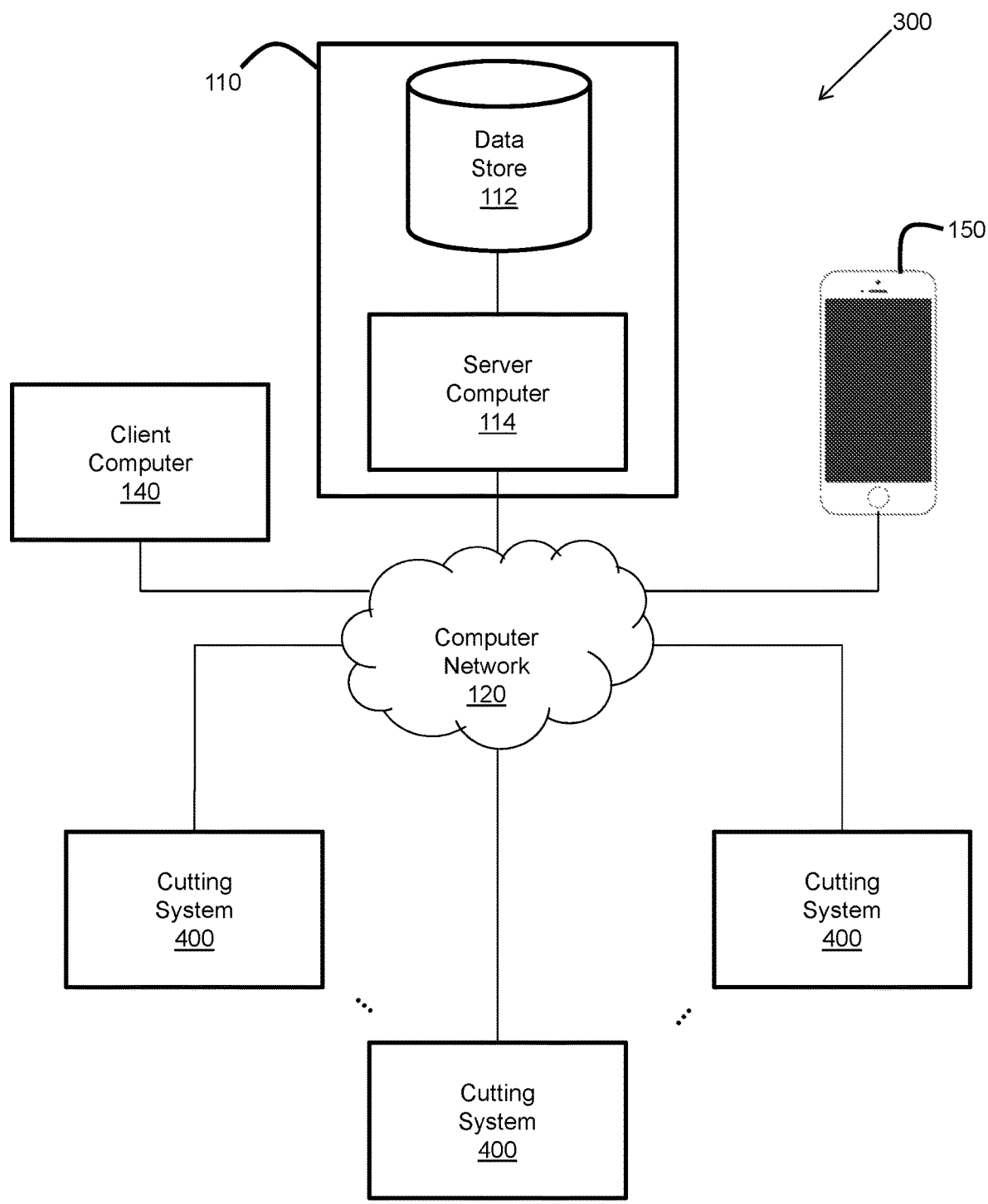
FIG. 3 illustrates a second embodiment of a system architecture having a system (a server computer and a data store) being located, for example, in the cloud remotely from a plurality of metal cutting systems and client computers.

Similarly to FIG. 1, FIG. 3 illustrates a second embodiment of a system architecture 300 having a system 110 (including a server computer 114 and a data store 112) being located, for example, in the cloud remotely from a plurality of metal cutting systems 400, a client computer(s) 140 (e.g., desktop or laptop PCs), and a mobile device(s) 150 (e.g., smart phones). In alternative embodiments, the system 110 is not located in the cloud (e.g., the system 110 is located in a manufacturing facility with the cutting systems 400). The mobile device(s) 150 is effectively a type of client computer as well. Therefore, at times herein, the term "client computer" may be used broadly to refer to any type of client computer. Each metal cutting system 400 (e.g., a plasma cutting system) may include, for example, a power source, a cutting tool (torch), and a robot subsystem to move the cutting tool (torch), or a part being cut, with respect to each other to make cuts on the metal part. Alternatively, instead of having a robot subsystem, a human operator may move the cutting tool (torch) with respect to a metal part during a cutting operation (e.g., a manual cutting operation).

In FIG. 3, the metal cutting systems 400, the client computer(s) 140, and the mobile device(s) 150 communicate with the system 110 via a computer network 120. In accordance with one embodiment, the computer network 120 is the Internet and the system 110 is located remotely from the cutting systems 400, the client computer(s) 140, and the mobile device(s) 150 in the cloud. In accordance with other embodiments, the computer network 120 may be, for example, a local area network (LAN), a wide area network (WAN), or some other type of computer network that is appropriate for the environment (e.g., the cloud, a campus, or a manufacturing facility) in which the system 110 exists with respect to the cutting systems 400, the client computers 140, and the mobile devices 150. Furthermore, the computer network 120 may be wired, wireless, or some combination thereof, in accordance with various embodiments. In accordance with one embodiment, the metal cutting systems 400 connect to the computer network 120 via an Ethernet connection.

As discussed later herein in more detail, in one embodiment, the server computer 114 is configured to receive cutting data from the metal cutting systems 400 over the computer network 120, analyze the cutting data, and store the results of the analysis (e.g., grouped cutting data) in the data store 112. Furthermore, in one embodiment, the server computer 114 is configured to receive client requests for data from the client computer(s) 140 and the mobile device(s) 150, retrieve the requested data from the data store 112, and provide the requested data to the client computer(s) 140 and the mobile device(s) 150 over the computer network 120. In such an embodiment, the server computer 114 and the data store 112 are configured as a database system that can be queried for the cutting data, as stored, by a client computer 140 or mobile device 150 operatively connected to the computer network 120.

Figure 4:
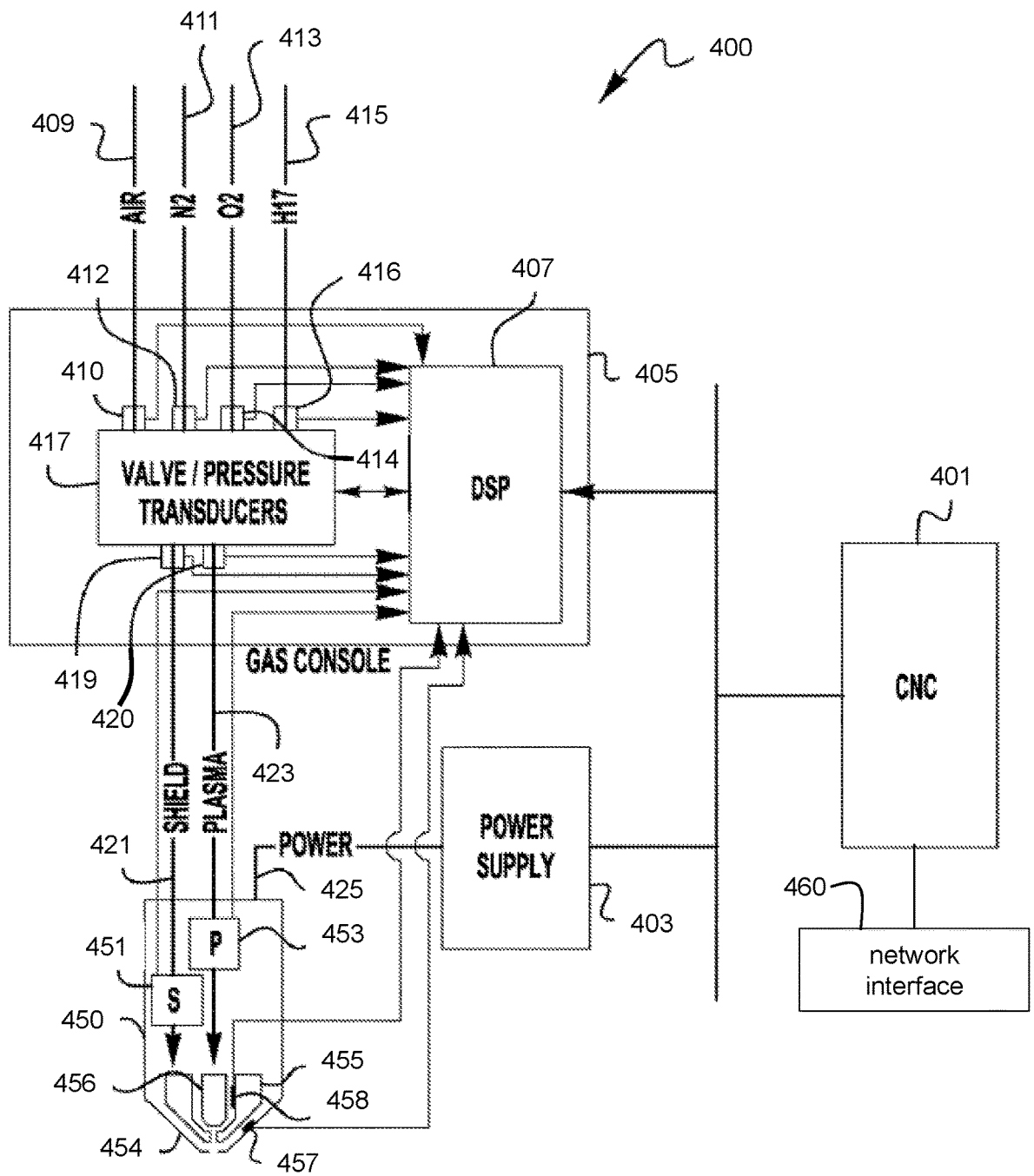
FIG. 4 illustrates a schematic block diagram of one example embodiment of a metal cutting system of the system architecture of FIG. 3.

FIG. 4 illustrates a schematic block diagram of one example embodiment of a metal cutting system 400 of the system architecture 300 of FIG. 3. The metal cutting system 400 includes a computer numerical control (CNC) device 401 which can control the overall operation of the cutting process and system 400. In one embodiment, the CNC 401 is configured, used, and constructed in accordance with known automated systems and need not be described in detail herein. The system 400 includes a power supply 403 which provides the cutting current to the torch 450 (cutting tool) to generate the plasma arc for cutting. As is generally known, the CNC 401 can control the power supply 403 to provide the desired output over electrical line 425 at the desired time in the cutting operation. Embodiments of the present invention are not limited by the design and construction of the power supply 403, which can be constructed consistent with known power supplies. Further, the system 400 includes a gas console 405 which can be generally constructed similar to known gas consoles, and includes gas lines and valves to deliver the needed gases to the cutting tool (torch) 450. In the shown embodiment, the console has four gas lines feeding into it from sources (not shown) such as tanks. As shown, there is an air line 409, a nitrogen line 411, an oxygen line 413 and a cutting gas line 415. These gases can be used to create the cutting plasma, and the air, nitrogen, and oxygen can be used for shielding. These gases are used, and combined, to provide a shielding gas and a plasma gas to the torch. The mixture and use of these gases are generally known, and need not be discussed in detail herein. As shown, the gas lines feed into a manifold 417 which can contain a plurality of valves (not shown) which control the flow of and mixture of the gases. Each of these valves can be electronically controlled valves such that they can be controlled via a controller, such as a digital signal processor DSP 407. The DSP receives control signals from the controller/CNC 401, and thus the flow of the respective gases can be controlled. In some exemplary embodiments, the controller/CNC 401 can be used to select the gas types needed and the flow control is controlled by the DSP. As shown, as an output of the manifold 417 there is a shield gas line 421 and a plasma gas line 423 which feeds each of these respective gas mixtures to the torch 450. Further, as shown in FIG. 4, in some exemplary embodiments, there are a plurality of pressure sensors (such as pressure transducers) positioned on and/or within the manifold 417 such that the respective pressures of each of the lines (incoming and outgoing) can be detected and signaled to the DSP 407, and ultimately to the controller 401.

For example, in some exemplary embodiments, the incoming gas lines 409, 411, 413 and 415, each have a pressure sensing device 410, 412, 414 and 416, respectively, which detects the pressure of the incoming gas to the console and/or manifold. This pressure data can be used by the CNC/controller 401 to ensure that an adequate incoming pressure is achieved. For example, a particular cutting operation may require a certain amount of pressure/flow from each of the respective gas sources, and the controller 401 uses the sensed pressure from each of these sensors to ensure that adequate pressure/flow from the gas sources is available.

Further, as shown, in exemplary embodiments of the present invention, each of the upstream ends of the shield and plasma gas lines (421 and 423, respectively) can have pressure sensors 419 and 420 to detect the beginning pressure in each of these lines. This pressure data is also sent via the DSP 407 to the controller 401, where the controller 401 can, again, use this detected pressure data to ensure that a proper flow of gas is being provided to the torch. That is, the controller 401 can use this pressure data to control each of the respective flow control valves (not shown) to ensure that the proper flow/pressure of gas is achieved for any given cutting operation. Thus, rather than using an open loop control methodology or a closed loop feedback limited to only feedback from the gas console, embodiments of the present invention can use a closed loop feedback control methodology, where the sensed pressure is used by the controller to ensure a desired amount of gas pressure and/or gas flow is being provided to the gas lines 421 and 423. The controller 401 would control the valves to achieve the desired gas flow for a given cutting operation and/or a given state in a cutting operation (e.g., purge, pierce, cutting, tail out, etc.).

As shown, each of the shield and plasma gases are directed to a cutting tool (torch) assembly 450. The torch assembly 450 can be constructed similar to known plasma cutting tools (torches), including liquid cooled plasma cutting tools (torches) used, for example, in mechanized plasma cutting operations. Because the construction of such tools (torches) are generally known, a detailed discussion of their function and construction is not included herein. However, unlike known tools (torches), tool (torch) assemblies of one embodiment of the present invention include pressure sensors which detect the pressures of the gases at different locations within the tool (torch) 450. These detected pressures are, again, used by the DSP 407 and/or controller 401 to control the flow of gas to the tool (torch) 450.

For example, as shown, in an exemplary embodiment of the present invention, pressure sensors 451 (shield gas) and 453 (plasma gas) can be used to detect the pressure of gas flowing into the torch assembly. For example, these sensors 451/453 can be located at the upstream end of the torch assembly 450 to detect the pressure of the gases as they enter the torch 450. The sensors can be located at the gas connections from the gas lines to the torch body assembly, or can be located between the torch body assembly and the torch head assembly. The pressure sensors should be of a type that can fit within the gas lines and/or connections and not obstruct the flow of the gas such that the flow or operation of the torch is compromised. These sensors can then be used by the controller 401 to detect a pressure drop, if any, from the console 405 to the torch 450.

Further, as shown, in FIG. 4, the torch assembly includes at least a shield cap 454, a nozzle 455, and an electrode 456. Of course, the torch assembly can contain other components as well, such as a swirl ring, retaining cap, etc. As shown, the torch assembly 450 contains additional pressure sensors (e.g., transducers) to sense the pressure of the torch gases at different locations within the torch 450. For example, as shown, a sensor 457 is located on an inner surface of the shield cap so as to detect the pressure of the shield gas during operation, and a plasma chamber pressure gauge 458 is located in the cavity between the nozzle 455 and the electrode 456 to detect the pressure of the plasma gas within the plasma gas chamber. These sensors 457/458 provide sensed pressure data to the DSP 407 and/or the controller 401 such that the controller 401 can use the sensed pressure to monitor the operation of the cutting process/torch and provide dynamic control of the cutting operation based on the detected pressures.

In accordance with one embodiment, the controller 401 measures, calculates, and collects various types of cutting data from the metal cutting system 400 for each cut created, including core cutting data and non-core cutting data. Techniques for measuring, calculating, and collecting various types of core cutting data are well known in the art. Core cutting data may include data related to parameters of one or more of, for example, arc voltage, cutting current, various gas pressures, various gas flow rates, initial pierce height, work angle of the cutting tool (torch), travel angle of the cutting tool (torch), cutting speed of the cutting tool (torch), tool (torch)-to-work distance, and cutting movements of the cutting tool (torch). Such core cutting parameters are well-known in the art.

Non-core cutting data may include data related to, for example, pre-idle times (i.e., the idle time before a cut is started), non-cutting movements of a cutting tool (torch) between generating consecutive cuts on a part, temperatures of a part after each cut, time, day, and date. Other types of core cutting data and non-core cutting data are possible as well, in accordance with other embodiments. For example, other data may include operator ID and part ID.

The data related to pre-idle times (i.e., the idle time before a cut is started) may be generated by, for example, timer circuitry (not shown) within the controller 401, in accordance with one embodiment, based on times when the data related to the arc voltage and/or cutting current are not indicating that a cut is being generated, for example. The data related to non-cutting movements of a cutting tool (torch) between generating consecutive cuts on a part may be generated by, for example, a gyroscope, an accelerometer, or some other type of inertial measurement unit (not shown) attached to or integrated into the cutting tool (torch) and operatively connected to the controller 401, in accordance with various embodiments. The data related to temperatures of a part after each cut may be generated by, for example, an infrared sensor (not shown) or some other type of temperature sensor of the metal cutting system 400 operatively connected to the controller 401, in accordance with various embodiments.

The metal cutting system 400 includes a network interface 460 operatively connected to the controller 401, in accordance with one embodiment. The network interface 460 (e.g., an Ethernet interface in one embodiment) is configured to take the core cutting data and the non-core cutting data from the controller 401, for each cut generated on a part by the metal cutting system 400, and communicate the core cutting data and the non-core cutting data over the computer network 120 (e.g., the Internet) to the system 110 (e.g., in the cloud). In this way, the system 110 is able to collect cutting data (core and non-core) from each metal cutting system 400 of the system architecture 100 for analysis. In accordance with one embodiment, the network interface 460 is part of the controller 401.

Figure 5:
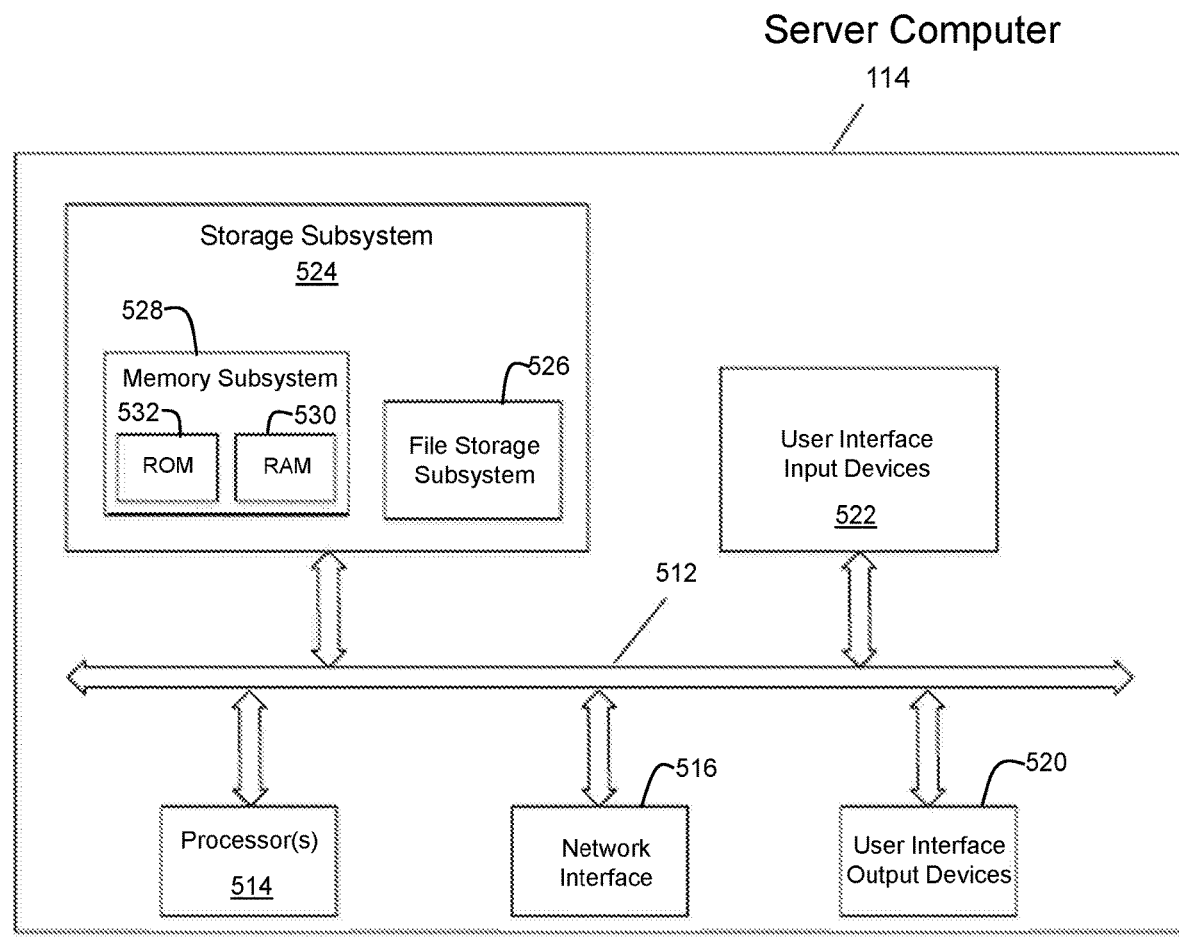
FIG. 5 illustrates one example embodiment of the server computer of FIG. 1 or FIG. 3 emphasizing a hardware architecture.

FIG. 5 illustrates one example embodiment of the server computer 114 of FIG. 1 and FIG. 3 emphasizing a hardware architecture. The server computer 114 includes at least one processor 514 which communicates with a number of peripheral devices via bus subsystem 512. These peripheral devices may include a storage subsystem 524, including, for example, a memory subsystem 528 and a file storage subsystem 526, user interface input devices 522, user interface output devices 520, and a network interface subsystem 516. The input and output devices allow user interaction with the server computer 114. Network interface subsystem 516 provides an interface to outside networks (e.g., the Internet) and is coupled to corresponding interface devices in other computer systems. For example, the controller 230 of the welding system 200 and the controller/CNC 401 of the metal cutting system 400 may share one or more characteristics with the server computer 114 and may be, for example, a conventional computer, a digital signal processor, and/or other computing device.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the server computer 114 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the server computer 114 to the user or to another machine or computer system.

Storage subsystem 524 stores programming and data constructs that provide or support some or all of the functionality described herein (e.g., as software modules/components). For example, the storage subsystem 524 may include analytic software modules (e.g., a cluster analysis module) for identifying and grouping welds and cuts.

Software modules are generally executed by processor 514 alone or in combination with other processors. Memory 528 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 526 in the storage subsystem 524, or in other machines accessible by the processor(s) 514.

In accordance with some embodiments, the data store 112 of FIG. 1 and FIG. 3 may have elements similar to the elements of the storage subsystem 524 of FIG. 5. Information in the data store 112 can be stored in a variety of data structures including, for example, lists, arrays, and/or databases. Furthermore, information stored in the data store 112 can include one or more of the following: data stored in a relational database, data stored in a hierarchical database, text documents, graphical images, audio information, streaming video; and other information associated with welding or cutting.

Bus subsystem 512 provides a mechanism for letting the various components and subsystems of the server computer 114 communicate with each other as intended. Although bus subsystem 512 is shown schematically as a single bus, alternative embodiments of the bus subsystem may use multiple buses.

Due to the ever-changing nature of computing devices and networks, the description of the server computer 114 depicted in FIG. 5 is intended only as a specific example for purposes of illustrating some embodiments. Many other configurations of the server computer 114 are possible, having more or fewer components than the server computer depicted in FIG. 5.

Figure 6:
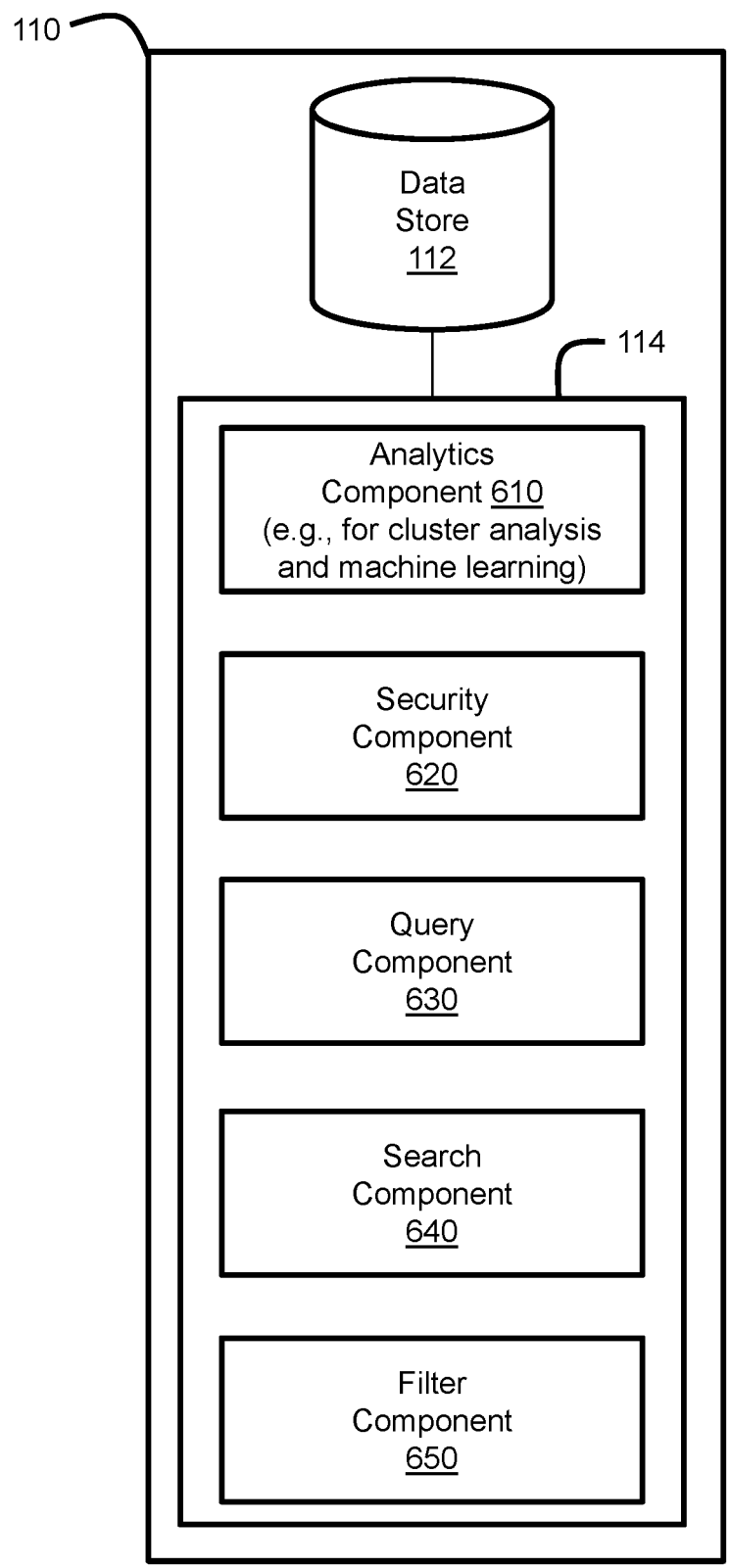
FIG. 6 illustrates one example embodiment of the system of FIG. 1 and FIG. 3 emphasizing a functional component architecture of the server computer.

FIG. 6 illustrates one example embodiment of the system 110 of FIG. 1 and FIG. 3 emphasizing a functional component architecture of the server computer 114. In FIG. 6, the server computer 114 includes an analytics component 610, a security component 620, a query component 630, a search component 640, and a filter component 650. In accordance with one embodiment these components are software components or software modules that execute on, for example, the processor(s) 514 of FIG. 5.

The security component 620 is configured to establish a secure connection between a welding system, a cutting system, a client computer, and/or users thereof. Additionally, the security component 620 is configured to establish access rights for a welding system, a cutting system, a client computer, and/or users thereof. Given that welding data or cutting data may be transferred over public networks such as, for example, the Internet, the security component 620 can provide encrypted data communication along with authentication and authorization services between the system 110 and a welding system, a cutting system, or a client computer. Such encryption, authentication, and authorization techniques are well known and may be applied in the server computer 114. For example, U.S. Pat. No. 8,224,881, which is incorporated herein by reference, elaborates on such techniques.

The query component 630 is configured to help a user formulate search criteria to be used by the search component 640 to locate welding data or cutting data as stored in the data store 112. Once a query has been formulated, the search component 640 searches the data store 112 based on information received from a client computer and search criteria formulated using the query component 630. For example, in one embodiment, the query component 630 can be adapted to extract welding information or cutting information from a user query (e.g., based on natural language input). Such query techniques are well known and may be applied in the server computer 114. For example, U.S. Pat. No. 8,224,881, which is incorporated herein by reference, elaborates on such techniques. In response to receiving a query from the query component 630, the search component 640 searches for welding information or cutting information. The search component 640 may employ various techniques (e.g., based upon a Bayesian model, an artificial intelligence model, probability tree networks, fuzzy logic and/or neural network) when searching for welding or cutting data. Such searching techniques are well known and may be applied in the server computer 114. For example, U.S. Pat. No. 8,224,881, which is incorporated herein by reference, elaborates on such techniques.

The filter component 650 is configured to filter results of the search component 640 to facilitate preparation of data sets to be used as input data into, for example, a machine learning (ML) algorithm. The filtering is based, at least in part, on information received from the client computer requesting the search. For example, in one embodiment, the filter component 650 may filter the search results in preparation for using a ML algorithm that is configured to operate on input data to, for example, track preventive maintenance activities and red flag welding or cutting related issues on any station in a production line; allowing engineers to prevent problems before they occur. Such filtering techniques are well known and may be applied in the server computer 114. For example, U.S. Pat. No. 8,224,881, which is incorporated herein by reference, elaborates on such techniques. In accordance with one embodiment, the analytics component 610 of the server computer 114 may implement the ML algorithm. Alternatively, the ML algorithm may be implemented on the client computer, for example.

However, in accordance with one embodiment, the analytics component 610 is configured to perform a pre-processing analysis of data before storing the data in the data store 112 and, therefore, before a client computer connects to the system 110 and searches for the data stored in the data store 112. As indicated previously herein, when attempting to analyze collected welding or cutting data with advanced Machine Learning (ML) algorithms, there is a high degree of difficulty when clustering data for individual welds or cuts. This is difficult because the welding or cutting data is often unlabeled from a traceability point of view. The source of the data is known and normally the part number of a part type is easy to record, but the individual identification of a weld or cut taking place on a part is often unknown/unlabeled. In addition, several welds (or cuts) can easily overlap, from a clustering point of view, because the data parameters are similar but the welds (or cuts) need to be allocated into different clusters. Therefore, in one embodiment, the analytics component 610 of the server computer 114 is configured to perform an analysis on welding data (or cutting data) to identify and group same individual welds (or cuts) made on multiple instances of a same type of part without relying on weld profile identification numbers (or cutting profile identification numbers) as part of the analysis, as discussed below herein.

Figure 7:
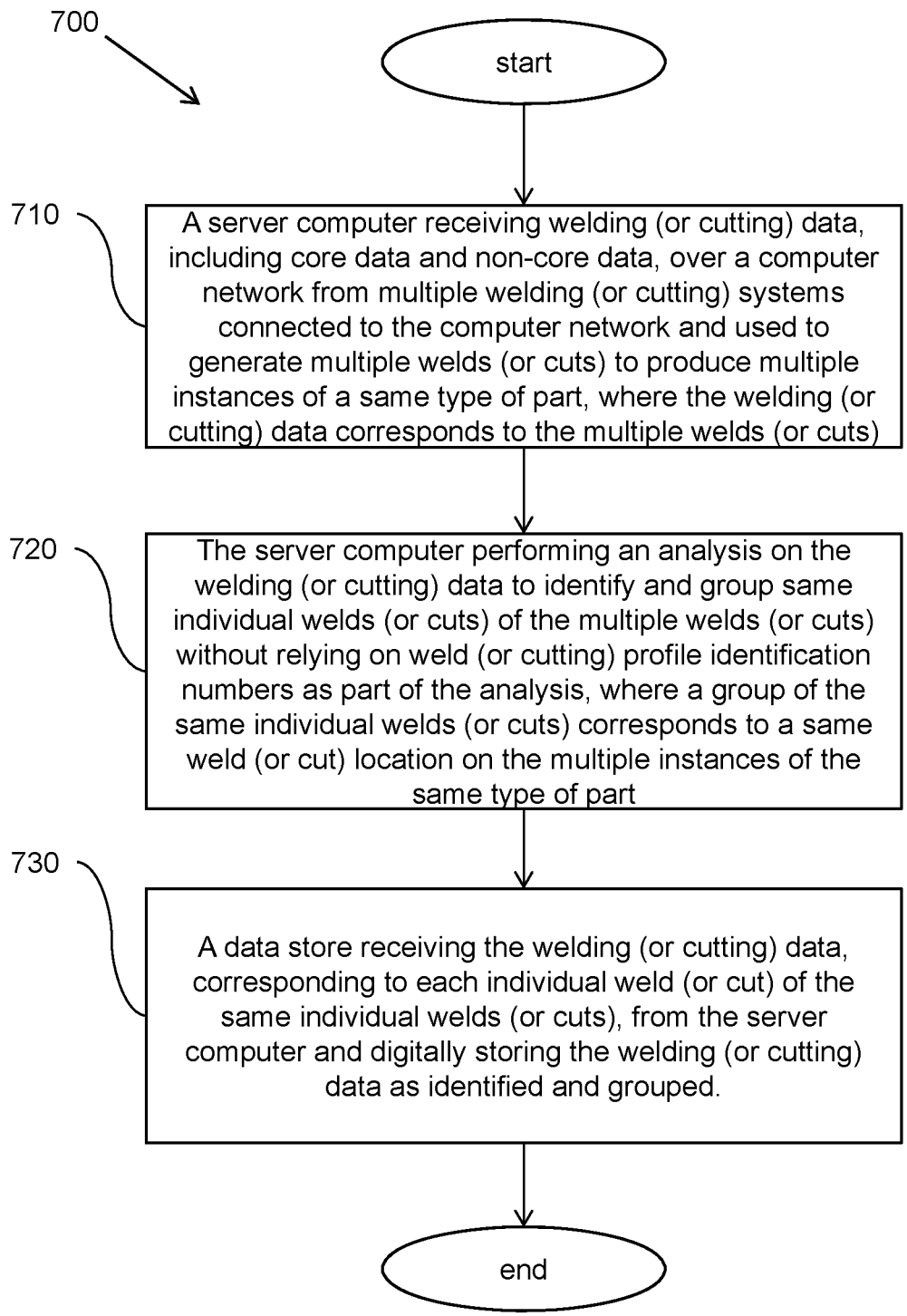
FIG. 7 is a flowchart of one embodiment of a method to identify and group welding (or cutting) data corresponding to same individual welds (or cuts) using, for example, the system in FIG. 1, FIG. 3, or FIG. 6.

FIG. 7 is a flowchart of one embodiment of a method 700 to identify and group welding (or cutting) data corresponding to same individual welds (or cuts) using, for example, the system 110 in FIG. 1, FIG. 3, or FIG. 6. At step 710 of the method 700, a server computer 114, having an analytics component 610, receives welding (or cutting) data, including core welding (or cutting) data and non-core welding (or cutting) data, over a computer network 120 from multiple welding (or cutting) systems 200 (or 400) operatively connected to the computer network 120 and used to generate multiple welds (or cuts) to produce multiple instances of a same type of part. The welding (or cutting) data corresponds to the multiple welds (or cuts). The multiple instances of the same type of part may be, for example, multiple instances of a truss for a bridge.

At block 720 of the method 700, the server computer 114 performs an analysis on the welding (or cutting) data to identify and group same individual welds (or cuts) of the multiple welds (or cuts) without relying on weld (or cutting) profile identification numbers as part of the analysis. A grouping of the same individual welds (or cuts) corresponds to a same weld (or cut) location on the multiple instances of the same type of part.

A weld (or cutting) profile identification number is a numeric value that would ideally identify individual welds (or cuts) that correspond to the same location on the multiple instances of the same type of part. However, as discussed previously herein, weld (or cutting) profile identification numbers can be unknowingly reused which could result in incorrectly grouping a dissimilar batch of weld (or cut) records (welding or cutting data for different types of welds or cuts). Incorrect identification would cause additional problems with defect detection, traceability, and grouping of data for further analysis. In another example, weld (or cutting) profile identification numbers may not be defined or may only be partially defined by the system controller. This again causes problems with defect detection, traceability, and grouping of data. In the method 700, the use of two different categories of data (i.e., non-core welding (or cutting) data along with core welding (or cutting) data) allows for the correct grouping of welds (or cuts) without using or relying on profile identification numbers or any other type of indices that might attempt to specifically identify a particular weld (or cut) location on a part.

At block 730 of the method 700, a data store 112 receives the welding (or cutting) data, corresponding to each individual weld (or cut) of the same individual welds (or cuts), from the server computer 114 and digitally stores the welding (or cutting) data as identified and grouped. In this manner, the welding (or cutting) data originally received from the welding (or cutting) systems has effectively been pre-processed and stored in a manner that is more useful for further processing by, for example, machine learning (ML) algorithms. Such ML algorithms may be used, for example, for analyzing welding (or cutting) performance and for scheduling and tracking preventative maintenance activities.

In accordance with one embodiment, the analysis performed at block 720 of the method 700 includes a cluster analysis which properly groups data related to welds (or cuts) corresponding to a same location on multiple instances of the same type of part being manufactured. The use of the non-core welding (or cutting) data along with the core welding (or cutting) data in the cluster analysis greatly improves the likelihood that correct groupings of the welding (or cutting) data will be formed.

In general, cluster analysis is a type of classification analysis that groups sets of data (e.g., data corresponding to objects) in a manner such that the elements of the resultant groups (or clusters) are more similar to each other than the elements in the other groups. Cluster analysis algorithms are used to perform cluster analysis. Some types of cluster analysis algorithms include connectivity-based clustering algorithms, centroid-based clustering algorithms, distribution-based clustering algorithms, and density-based clustering algorithms. Such types of cluster analysis algorithms are well known in the art of cluster analysis. Other types of clustering algorithms may be possible as well.

Figure 8A:
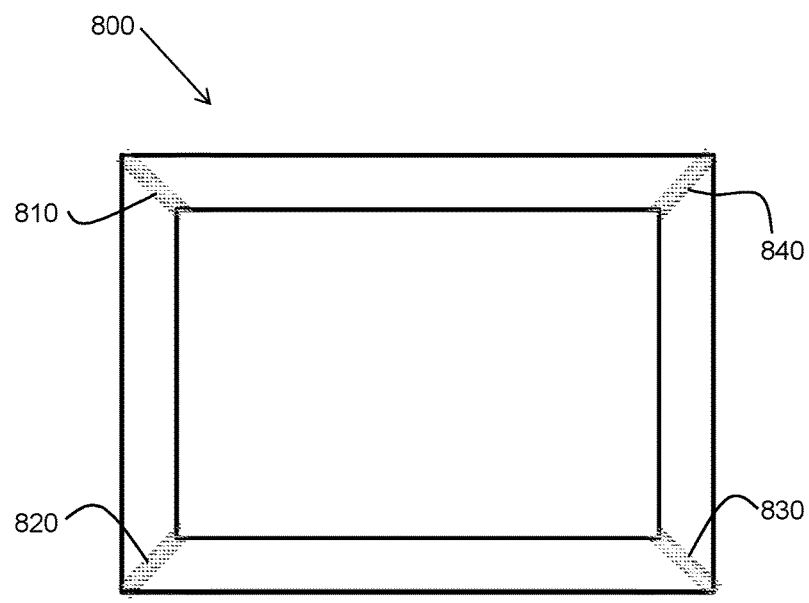
FIG. 8A and FIG. 8B illustrate a part and a table, respectively, providing an example of the method of FIG. 7.
Figure 8B:
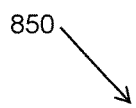

FIGS. 8A and 8B illustrate a part 800 and a table 850, respectively, providing an example of the method 700 of FIG. 7. Referring to FIG. 8A, a type of part that has been manufactured includes four (4) welds including a first weld 810, a second weld 820, a third weld 830, and a fourth weld 840. The type of part 800 may be, for example, a metal frame structure having four (4) sides that have been welded together at the corners of the resultant frame structure. Multiple instances of the same type of part 800 may be produced in the same manner by generating four (4) welds.

FIG. 8B shows a table 850 of data corresponding to the four (4) welds for four (4) of the same type of part 800 that have been manufactured. There are eight (8) rows of data in the table 850. In accordance with one embodiment, the data that actually gets sent to the system 110 for each instance of a weld is the weld number, the voltage, the amperage (current), and the pre-idle time. The weld number simply indicates an individual weld but does not provide any other indication of which weld it is. Furthermore, no weld profile identification numbers are provided corresponding to weld locations on the part. The voltage is the welding output voltage used to make the weld and the amperage is the welding output current used to make the weld. The voltage and the amperage constitute core welding data.

However, if only the core welding data (voltage and amperage) were processed in the cluster analysis, the cluster analysis would generate only two (2) groups of welds . . . a first group of welds having a voltage of 24.0 volts and an amperage of 200 amps, and a second group of welds having a voltage of 26.5 volts and an amperage of 350 amps. However, we know from FIG. 8A (and the Part Weld ID column of FIG. 8B which is not sent to the system 110) that the part 800 actually has four (4) different welds (810, 820, 830, and 840) corresponding to four (4) different weld locations. Therefore, the groupings would be incorrect and misleading to subsequent algorithms (e.g., ML algorithms) that use these incorrect groupings of welding data.

However, by adding the non-core welding data of the pre-idle time, the cluster analysis would be able to correctly discern between and group the four (4) different welds. As previously discussed herein, the pre-idle time is the idle time before a weld (or cut) is started. As shown in FIG. 8B, the table 850 includes weld data for the four (4) different welds from at least two (2) different parts of the same type (i.e., part type 800). Therefore, by including the non-core welding data of pre-idle time, the cluster analysis would correctly form four (4) groups (clusters) of the same individual welds. In the table 850 of FIG. 8B, the first group (cluster) is indicated by a Part Weld ID of 1, the second group (cluster) is indicated by a Part Weld ID of 2, the third group (cluster) is indicated by a Part Weld ID of 3, and the fourth group (cluster) is indicated by a Part Weld ID of 4, even though these Part Weld IDs are not part of the weld data actually sent to the system 110 for analysis.

In this manner, proper groupings (clusterings) of welding data (or cutting data) for the same weld locations (or cut locations) on a part can be achieved without using profile identification numbers sent from, for example, the welding systems 200 (or the cutting systems 400). Furthermore, depending on other parameters (e.g., time stamps of data) coming into the system 110 from the welding systems 200 (or the cutting systems 400), analysis (e.g., a type of pattern recognition analysis) may be performed on the core data and the non-core data, along with the other parameters (also considered non-core data), to properly determine a sequence (i.e., a time order) in which the multiple welds (or cuts) on a particular part were generated.

As discussed previously herein, for welding, the core welding data may include one or more of welding output voltages, welding output currents, wire feed speeds, arc lengths, stick outs, contact tip-to-work distances (CTWD), work angles, travel angles, travel speeds, gas flow rates, welding movements of the welding tool (torch), wire types, amounts of wire used, and deposition rates. For cutting, the core cutting data may include one or more of arc voltages, cutting currents, various gas pressures, various gas flow rates, initial pierce heights, work angles of the cutting tool (torch), travel angles of the cutting tool (torch), cutting speeds of the cutting tool (torch), tool (torch)-to-work distances, and cutting movements of the cutting tool (torch).

The non-core welding (or cutting) data may include pre-idle time data. The non-core welding (or cutting) data may include data related to non-welding (or non-cutting) movements of a welding tool (torch) (or cutting tool (torch)) between consecutive welds (or cuts) on the multiple instances of the same type of part. The non-core welding (or cutting) data may include data related to temperatures of the multiple instances of the same type of part, for example, after each weld (or cut) is made. Other types of core and non-core welding (or cutting) data are possible as well, in accordance with other embodiments.

Again, embodiments of the welding systems (or cutting systems) may include robotic welding systems (or robotic cutting systems), manual welding systems (or manual cutting systems), or semi-automatic welding systems. Furthermore, in accordance with one embodiment and as previously discussed herein, the server computer 114 and the data store 112 may be configured as a database system that can be queried for the welding data (or the cutting data), as stored in the data store 112, by a client computer (e.g., 140 or 150) operatively connected to the computer network 120.

The welding data or the cutting data as identified, grouped, and stored in the system 110 may subsequently be used effectively by machine learning (ML) algorithms of the system 110 (or by ML algorithms of other external systems) to, for example, classify the welds (or cuts) as meeting or not meeting one or more specifications. ML algorithms may be employed for other purposes as well (e.g., predictive and/or preventative maintenance purposes). In accordance with various embodiments, machine learning (ML) algorithms may be developed (e.g., trained) using at least one of a linear regression technique, a logistic regression technique, a decision tree technique, a K-Nearest Neighbor technique, a K-means technique, a support vector machine, a neural network, a Bayesian network, a tensor processing unit, a genetic algorithm, an evolutionary algorithm, a learning classifier system, a Gradient Boosting technique, or an AdaBoost technique. Other techniques may be possible as well, in accordance with other embodiments.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof

What is claimed is:

1. A system for welding production monitoring and data analysis, the system comprising:
   at least one server computer having an analytics component; and
   at least one data store operatively connected to the at least one server computer;
   wherein the at least one server computer is configured to:
      receive welding data, including core welding data and non-core welding data, over a computer network from a plurality of welding systems operatively connected to the computer network and used to generate multiple welds to produce multiple instances of a same type of part, wherein the welding data corresponds to the multiple welds, and
      perform an analysis on the welding data to identify and group same individual welds of the multiple welds without relying on weld profile identification numbers received from the plurality of welding systems as part of the analysis, wherein a group of the same individual welds corresponds to a same weld location on the multiple instances of the same type of part, and
   wherein the at least one data store is configured to receive the welding data, corresponding to each individual weld of the same individual welds, from the server computer and digitally store the welding data as identified and grouped.

2. The system of claim 1, wherein the analysis is a cluster analysis.

3. The system of claim 1, wherein the system is located remotely from the plurality of welding systems.

4. The system of claim 1, wherein the core welding data includes data related to at least one of welding output voltage, welding output current, wire feed speed, arc length, stick out, contact tip-to-work distance (CTWD), work angle, travel angle, travel speed, gas flow rate, welding movements of the welding tool, wire type, amount of wire used, and deposition rate.

5. The system of claim 1, wherein the non-core welding data includes data related to pre-idle time, being the idle time before a weld is started on the multiple instances of the same type of part.

6. The system of claim 1, wherein the non-core welding data includes data related to non-welding movements of a welding tool between consecutive welds on the multiple instances of the same type of part.

7. The system of claim 1, wherein the non-core welding data includes data related to temperatures of the multiple instances of the same type of part after each weld of the multiple welds is generated.

8. The system of claim 1, wherein the multiple welds are robotically generated by the plurality of welding systems.

9. The system of claim 1, wherein the multiple welds are manually generated or semi-automatically generated by human operators using the plurality of welding systems.

10. The system of claim 1, wherein the at least one server computer and the at least one data store are configured as a database system that can be queried for the welding data, as stored, by a client computer operatively connected to the computer network.

11. A system for metal cutting production monitoring and data analysis, the system comprising:
   at least one server computer having an analytics component; and
   at least one data store operatively connected to the at least one server computer;
   wherein the at least one server computer is configured to:
      receive cutting data, including core cutting data and non-core cutting data, over a computer network from a plurality of metal cutting systems operatively connected to the computer network and used to generate multiple cuts to produce multiple instances of a same type of part, wherein the cutting data corresponds to the multiple cuts, and
      perform an analysis on the cutting data to identify and group same individual cuts of the multiple cuts without relying on cutting profile identification numbers received from the plurality of metal cutting systems as part of the analysis, wherein a group of the same individual cuts corresponds to a same cut location on the multiple instances of the same type of part, and
   wherein the at least one data store is configured to receive the cutting data, corresponding to each individual cut of the same individual cuts, from the server computer and digitally store the cutting data as identified and grouped.

12. The system of claim 11, wherein the analysis is a cluster analysis.

13. The system of claim 11, wherein the system is located remotely from the plurality of cutting systems.

14. The system of claim 11, wherein the core cutting data includes data related to at least one of arc voltage, cutting current, various gas pressures, various gas flow rates, initial pierce height, work angle of the cutting tool, travel angle of the cutting tool, cutting speed of the cutting tool, tool-to-work distance, and cutting movements of the cutting tool.

15. The system of claim 11, wherein the non-core cutting data includes data related to pre-idle time, being the idle time before a cut is started on the multiple instances of the same type of part.

16. The system of claim 11, wherein the non-core cutting data includes data related to non-cutting movements of a cutting tool between consecutive cuts on the multiple instances of the same type of part.

17. The system of claim 11, wherein the non-core cutting data includes data related to temperatures of the multiple instances of the same type of part after each cut of the multiple cuts is generated.

18. The system of claim 11, wherein the multiple cuts are robotically generated by the plurality of metal cutting systems.

19. The system of claim 11, wherein the multiple cuts generated by human operators using the plurality of metal cutting systems.

20. The system of claim 11, wherein the at least one server computer and the at least one data store are configured as a database system that can be queried for the cutting data, as stored, by a client computer operatively connected to the computer network.

* * * * *